United States Patent Office 2,877,179
Patented Mar. 10, 1959

2,877,179

COMPOSITION FOR AND METHOD OF INHIBITING CORROSION OF METALS

William B. Hughes, Webster Groves, Mo., assignor to Cities Service Research and Development Company, New York, N. Y., a corporation of New Jersey No Drawing. Application March 26, 1956
Serial No. 573,623

7 Claims. (Cl. 252—8.55)

This invention relates to new compositions of matter, and more particularly with improved compositions and processes for inhibiting corrosion of metals.

It is generally recognized that oil-producing formations often yield with the crude oil brine which is extremely corrosive in its action upon the oil-producing and collecting equipment, including the metal tubing, casings, pumps, pipe lines, and storage equipment. This type of corrosion is particularly noticeable in wells producing brine which contain varying amounts of hydrogen sulfide, carbon dioxide, and other acidic materials therein.

Considerable effort has been directed in the past to reducing the cost of maintaining production and collection equipment free of corrosion by introducing into the well various neutralizer solutions such as caustic soda or other alkaline solutions. Other water-soluble corrosion inhibitors have also been used, such as formaldehyde, nitrogen bases of various types, amines, and combinations of the foregoing compounds. Experience has shown that while some of these corrosion inhibitors are satisfactory at certain locations when used in wells which produce little water as compared to the oil produced, their cost becomes prohibitive when used in wells producing large amounts of water, since substantially the same concentration of the inhibitor must be maintained in the water phase in both types of wells in order to prevent corrosion.

It is accordingly an object of this invention to provide improved corrosion inhibiting compounds having structures which make them uniquely effective in minimizing and reducing corrosion in wells producing oil-brine mixtures, and particularly reducing corrosion in wells in which large amounts of brine are produced as compared to oil.

It has been discovered that certain new compounds, namely imidazolidine-pyrrolinediones and the acid salts of such compounds, provide unexpected and exceptionally good protection for metallic surfaces against the corrosive action of various fluids, including brines and other fluids present in oil and gas wells. The imidazolidine-pyrrolinedione compounds which I have found to be superior corrosion inhibitors are prepared by reacting equimolar quantities of a polyethyleneamine with an aldehyde to provide an intermediate imidazolidine reaction product. This intermediate imidazolidine product is thereafter reacted with an equimolar amount of maleic acid anhydride, with a molar amount of water being removed to form the pyrrolinedione ring of the final imidazolidine-pyrrolinedione product. Formation of the pyrrolinedione compound is accomplished by reaction of the anhydride with the terminal amine group on the side chain of the intermediate imidazolidine compound.

This reaction may be generally represented as follows:

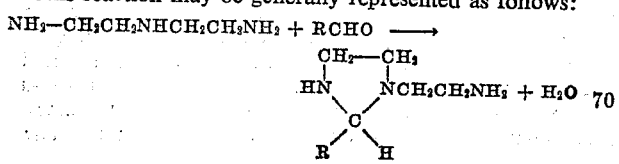

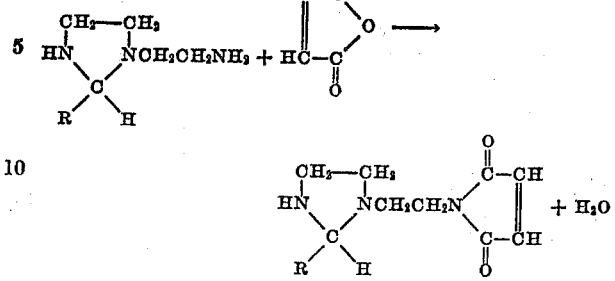

In the foregoing reaction, the R represents hydrogen or the chain of an aliphatic or aromatic aldehyde of from 1 to about 15 carbon atoms.

In preparing the imidazolidine-pyrrolinedione compounds of my invention, equimolar amounts of the selected polyethyleneamine and aldehyde are heated together, with an equimolar amount of water being removed from the reaction mixture by azeotropic distillation to effect formation of the imidazolidine ring. The azeotropic distillation is accomplished by adding to the reaction mixture a quantity of solvent such as benzene, xylene, toluene, or the like, and carrying out the distillation at a temperature of from about 80 to 140° C. Heating is conducted for a period of time sufficient to collect the theoretical amount of water to be expected from the equimolar reaction of the amine and the formaldehyde compounds. After this amount of water has been removed from the reaction mixture, the temperature of the mixture is increased substantially to approximately 250° C. to insure formation of the imidazolidine ring. It is, of course, understood that the temperature at which heating is carried out and the period of time involved will vary, depending on the amount and type of reactants used.

In preparing the intermediate imidazolidine product, a polyethyleneamine such as diethylene triamine, triethylene tetramine, or tetraethylene pentamine will be used. The aldehyde selected may generally be any low molecular weight aliphatic or aromatic aldehyde having from 1 to about 15 carbon atoms, such as but not limited to the following aldehydes: formaldehyde, paraformaldehyde, acetaldehyde, propanaldehyde, butyraldehyde, isobutyraldehyde, valeraldehyde, isovaleraldehyde, heptaldehyde, ethyl hexaldehyde, nonaldehyde, n-octylaldehyde. If desired, an aromatic aldehyde such as benzaldehyde, tolualdehyde, alphatolualdehyde, cinnamaldehyde, or salicylaldehyde can be used. Experience has shown that as between formaldehyde and paraformaldehyde, the latter is to be preferred due to its higher reaction rate with the polyethyleneamines. While the aldehydes preferred are generally the unsubstituted aldehydes, substituted aldehydes such as the hydroxy aldehydes can also be used.

In preparing the imidazolidine-pyrrolinediones of my invention, equimolar amounts of the intermediate reaction product and maleic anhydride are mixed and heated in the presence of an azeotrope-forming solvent such as benzene, toluene, or xylene. During the reaction, a mol of water should be removed for each mol of reactants utilized to insure formation of the pyrrolinedione ring on the side chain of the intermediate imidazolidine product. The reaction forming the pyrrolinedione ring occurs between the terminal amine group of the intermediate reaction product and the oxygen linking the carbons of the maleic anhydride molecule. It is, of course, understood that the particular imidazolidine-pyrrolinedione compounds formed will vary, depending on the polyethyleneamine compound used in preparing the intermediate product. If diethylene triamine is used, the pyrrolinedione ring will be separated from the imidazolidine ring by one ethyl group, whereas if triethylene tetramine is used in the formation of the imidazolidine ring, the pyrrolinedione ring will be separated by the group —$CH_2$—$CH_2$—NH—. Similarly, if the polyethyleneamine used in the preparation of the intermediate imidazolidine compound is tetraethylene pentamine, an intermediate product having a side chain including an additional ethylamine group will be obtained; thus the linkage between the imidazolidine ring and the pyrrolinedione ring will be —$CH_2$—$CH_2$—NH—$CH_2$—$CH_2$—NH—.

In order to more thoroughly understand the nature of the new compositions of my invention, the manner in which they are prepared, and their effectiveness in minimizing and inhibiting corrosion of metal surfaces, the following examples are provided:

EXAMPLE 1

To 103 grams (1.0 mol) of diethylene triamine, 30.3 grams (1.0 mol) of paraformaldehyde (99% formaldehyde) were added slowly with stirring, allowing sufficient time for each increment to react before additional material was added. When the initial reaction had subsided and all of the paraformaldehyde had been added, 50 ml. of xylene were added and the reaction mixture heated under a reflux condenser equipped with a decanter type still head and a water trap. Water was removed from the reaction mixture by means of the xylene-water azeotrope, with the water being recovered in the trap while the saturated benzene was continuously returned to the reaction zone. After a four hour heating period, approximately 18 grams of water had been collected, representing the theoretical amount to be expected from a 1:1 reaction of the aldehyde with the diamine in the formation of the imidazolidine ring. The xylene was removed by distillation, and the temperature of the mixture raised to approximately 285° C. to insure formation of the imidazolidine. This product was a light brown colored liquid which was soluble in water and had a molecular weight of 114.

To 114 grams (1.0 mol) of this intermediate product obtained by the foregoing reaction, 98 grams (1.0 mol) of maleic anhydride were added. The maleic anhydride had previously been dissolved by heating in 400 ml. of xylene and was added to the intermediate product slowly and with stirring. A rapid temperature rise was noted during addition of the anhydride which was controlled in part by refluxing of the xylene. After three and one-half hours, addition of the anhydride was complete, and heat was applied to the reaction mixture. After approximately 16 ml. of water were recovered, the xylene was distilled from the reaction zone. The recovered xylene amounted to about 380 ml. The temperature of the reaction mixture was then increased to 290° C. to insure complete removal of water and xylene and to effect the formation of the pyrrolinedione ring on the side chain of the intermediate product. The reaction mass was then cooled rapidly to prevent polymerization. The final product was a reddish brown, oil-soluble, semi-solid product at room temperature, and had a determined molecular weight of 119. This product was tested as a corrosion inhibitor, and is identified as inhibitor number 1 in Table 1 which follows.

EXAMPLE 2

Following the procedure outlined in Example 1, 1.0 mol of diethylene triamine was reacted with 1.0 mol of butyraldehyde to produce an intermediate imidazolidine reaction product by removing from the reaction zone by azeotropic distillation 1.0 mol of water. After washing of the intermediate product to remove unreacted material, followed by drying, an intermediate product was obtained having a molecular weight of 155. This is to be compared with a theoretical molecular weight value for this intermediate product of 159.

The intermediate product was thereafter reacted with an equimolar amount of maleic anhydride as described in Example 1 and under substantially the same conditions to produce a dark colored, semi-solid product having a molecular weight of 251. This final imidazolidine-pyrrolinedione is identified as inhibitor number 2 in Table 1 which follows.

EXAMPLE 3

Following the procedure outlined in the preceding examples, equimolar amounts (1.0 mol) of diethylene triamine and heptaldehyde were reacted to produce an intermediate imidazolidine-pyrrolinedione product having a molecular weight of 287. This intermediate product was reacted with an equimolar amount (1.0 mol) of maleic anhydride, and produced a final reaction product identified as inhibitor number 3 in Table 1 which follows.

EXAMPLE 4

To 1.0 mol of diethylene triamine (103 grams), 1.0 mol (106 grams) of benzaldehyde was reacted under conditions described in Example 1 to form the intermediate imidazolidine ring. After separation of water in the azeotrope-forming solvent, the intermediate product was reacted with an equimolar amount of maleic anhydride under conditions forming a pyrrolinedione ring on the side chain of the intermediate imidazolidine product. This final reaction product had a molecular weight of 268, and is identified as corrosion inhibitor number 4 in Table 1.

The effectiveness of my new compositions in reducing the corrosiveness of oil field brine may be more fully understood by reference to certain tests which I have conducted, using prepared brines to substantially duplicate well conditions. The test procedure involved a measurement of the corrosive action of the hypothetical well fluid as inhibited with compositions described above upon weighed, cleaned, and polished strips of number 18 gauge cold-rolled steel measuring one-quarter inch by four inches, under conditions closely approximating those existing in a producing well, and a comparison thereof with the results obtained by subjecting identical strips to the corrosive action of my hypothetical well fluid without inhibitor added.

The test includes the use of a number of bottles or flasks sufficient to provide one for the testing of corrosion inhibitors in varying amounts, and one for comparison (a blank) for each of the corrosion inhibitors being tested. To cleaned and numbered one liter Erlenmeyer flasks, 600 ml. of a 5 weight percent aqueous sodium chloride solution and 400 ml. of depolarized kerosene were added. A stopper provided with gas inlet and outlet ports was inserted in the flask, and natural gas or nitrogen was blown through the brine solution for about one hour to purge any oxygen present. After the purging was completed, the corrosion inhibitor being tested was added to each flask in amounts ranging from 10 to 50 p. p. m., based on the quantity of brine present in the flask. The weighed and cleaned test strips were then attached to the end of a glass rod in such a manner that two pieces of plastic laboratory tubing prevented contact between the strip and the glass, while a third piece of tubing held the strip firmly in position. The glass rod was then inserted through the rubber stopper in such a manner that one-half of the test strip was in contact with the kerosene, and the other half in contact with the aqueous layer. At all times precautions were maintained to exclude air from the bottles by frequent and liberal purging with the natural gas or nitrogen.

After addition of the inhibitor was completed, hydrogen sulfide gas was bubbled through the liquid until the liquid was saturated with the gas. The flask was then sealed and allowed to stand for 48 hours. The steel strip was then removed, washed in kerosene and then methanol, and finally washed with water prior to acid cleaning. The acid cleaning consisted of treating the test strip in a one weight percent hydrochloric acid solution for a few seconds, washing with water, and thoroughly wiping with cheesecloth. The acid treatment was repeated several times until the original luster of the test strip was obtained as nearly as possible with a minimum amount of acid treating. After acid treating was completed, the strips were again washed in methanol, followed by acetone, and were then reweighed to determine the weight loss. Blank runs were used for each inhibitor to provide the comparison basis.

The changes in weight of the test strips during the corrosion test were taken as a measure of the effectiveness of the inhibitor compositions; thus, a protection percent may be calculated for each of the test strips taken from the inhibited test fluids in accordance with the following formula:

$$\frac{L1-L2}{L1} \times 100 = \text{percent protection}$$

in which L1 is the loss in weight of strips taken from uninhibited test fluids, and L2 is the loss in weight of strips which were subjected to inhibited test fluids.

The results of tests carried out with the imidazolidine-pyrrolinedione structures of my invention are summarized in Table 1 below. Under "percent protection," two columns are provided for the respective test results obtained with the test described above when utilizing 25 and 10 p. p. m. respectively of the specific imidazolidine-pyrrolinedione structures identified. For comparative purposes, a commercially available inhibitor identified as commercial A under inhibitors was tested. It will be noted that in all cases, with the possible exception of inhibitor number 4, the protection provided by the new compounds of my invention was far superior to that provided by the commercial product.

Table 1

| Inhibitor Number | Formulation | Percent Protection | |
|---|---|---|---|
| | | 25 p. p. m. | 10 p. p. m. |
| 1 | DETA,[1] HCHO, Maleic Anhydride 1:1:1 | 98.7 | 87.3 |
| 2 | DETA,[1] Butyraldehyde Maleic Anhydride 1:1:1 | 92.5 | 90.8 |
| 3 | DETA,[1] Heptaldehyde Maleic Anhydride 1:1:1 | 95.3 | 90.3 |
| 4 | DETA,[1] Benzaldehyde Maleic Anhydride 1:1:1 | 80.1 | 62.9 |
| Com. A | TETA,[2] HCHO, Oleic Acid 1:1:4 | 76.1 | 64.6 |

[1] Diethylene triamine.
[2] Triethylene tetramine.

It will be evident from the foregoing table that corrosion may be effectively reduced to a value of one-tenth or less of that due to the natural flow of well fluids through the well tubing, pipe lines, and associated equipment by incorporating in the well fluid comparatively small quantities of the imidazolidine-pyrrolinedione compounds of this invention. As previously indicated, in addition to the imidazolidine-pyrrolinedione compounds, it has been further discovered that if these final reaction products are acidified so as to provide acid salts, their efficiency as corrosion inhibitors is substantially increased. This will be clearly evident from the examples and Table 2 which follow.

EXAMPLE 5

A molar quantity of the imidazolidine-pyrrolinedione compound prepared according to Example 1 was further treated with 1.0 mol of oleic acid to produce an oleate salt. The addition of the oleic acid to the imidazolidine-pyrrolinedione compound resulted in a spontaneous reaction, with considerable heat being liberated during the addition. No additional external heat was added to the reaction mixture. The resulting salt was a brown semi-solid, and is identified as inhibitor number 1 in Table 2 which follows.

EXAMPLE 6

In a manner similar to that described in preceding Example 5, molar amounts of the imidazolidine-pyrrolinedione compound of Example 1 and dimerized linoleic acid (600 grams) were carefully reacted to produce a clear brown viscous liquid. This product is identified as inhibitor number 5 in Table 2 which follows. It will be noted that this product provides substantially complete protection under the conditions tested, even in concentrations as low as the indicated 10 p. p. m.

EXAMPLE 7

To 1 mol of the final reaction product of Example 2, that is, the reaction product obtained by reacting diethyleneamine triamine, butyraldehyde and maleic anhydride, 1 mol of dimerized linoleic acid was added to provide the acid salt of this product. This product is identified as inhibitor number 12 in Table 2 which follows.

EXAMPLE 8

To 1.0 mol of the final reaction product, obtained according to Example 3, 1.0 mol of lauric acid was added under the conditions described in Example 6 to provide an acid salt of the particular imidazolidine-pyrrolinedione, which product is identified as inhibitor number 7 in Table 2 which follows.

EXAMPLE 9

Following the method outlined in Example 6, 1.0 mol of succinic acid was added to the final reaction product obtained according to Example 2. The recovered acid salt, identified as inhibitor number 13 in Table 2, provided the protection indicated thereunder.

EXAMPLE 10

To 1.0 mol of the reaction product of Example 1, 1.0 mol of succinic acid was added with control of spontaneous heat to provide a final imidazolidine-pyrrolinedione acid salt product identified as inhibitor number 4 in Table 2 which follows.

In addition to the acids identified in the foregoing Examples 6–10 and Table 2 which follows, I have found that the following acids may also be used in the preparation of the acid salts of the imidazolidine-pyrrolinedione compounds. These are: acetic, propionic, sebacic, terephthalic, mucic, valeric, caproic, myristic, and stearic.

It will be readily apparent from the foregoing examples that it is possible to prepare the acid salts of the previously described imidazolidine-pyrrolinedione compounds according to the method described. Quite unexpectedly, all of the acid salts as indicated in Table 2 provide a very high degree of protection for the metal surfaces in which they were placed in contact. Table 2 which follows offers the comparative results of the various imidazolidine-pyrrolinedione salts prepared according to the foregoing examples and as an indication of the high degree of efficiency of such compounds in inhibiting corrosion of metal surfaces when subjected to the action of corrosive fluids.

Table 2

| Corrosion Inhibitor | Formulation | Percent Protection | |
|---|---|---|---|
| | | 25 p. p. m. | 10 p. p. m. |
| 1 | DETA,[1] HCHO, Maleic Anhydride Oleic Acid. | 99.1 | 98.3 |
| 2 | DETA,[1] HCHO, Maleic Anhydride Lauric Acid. | 96.4 | 93.1 |
| 3 | DETA,[1] HCHO, Maleic Andydride Palmitic Acid. | 97.9 | 90.5 |
| 4 | DETA,[1] HCHO, Maleic Anhydride Succinic Acid. | 98.2 | 91.0 |
| 5 | DETA,[1] HCHO, Maleic Anhydride Dimer Acid. | 98.8 | 99.0 |
| 6 | DETA Heptaldehyde Maleic Anhydride Oleic. | 98.2 | 97.9 |
| 7 | DETA Heptaldehyde Maleic Anhydride Lauric. | 99.1 | 90.2 |
| 8 | DETA Heptaldehyde Maleic Anhydride Palmitic. | 94.7 | 93.2 |
| 9 | DETA Heptaldehyde Maleic Anhydride Dimer. | 98.9 | 97.9 |
| 10 | DETA Butyraldehyde Maleic Anhydride Oleic. | 98.3 | 94.9 |
| 11 | DETA Butyraldehyde Maleic Anhydride Lauric. | 96.2 | 90.3 |
| 12 | DETA Butyraldehyde Maleic Anhydride Dimer. | 99.3 | 98.7 |
| 13 | DETA Butyraldehyde Maleic Anhydride Succinic. | 96.4 | 94.8 |

[1] Diethylene triamine.

In using my improved compositions for protecting the piping, casings, and other equipment which comes in contact with the corrosive fluids, I have found that excellent results may be obtained by injecting an appropriate quantity, generally not more than 2000 p. p. m., of a selected corrosion inhibiting compound into a producing well so that it may mingle with the oil brine mixture and come into contact with the producing equipment. If desired, the inhibiting composition may be introduced directly into the top of the casing and be permitted to flow down into the well, and thence back through the tubing and into related apparatus. I have found that if this procedure is followed, substantial reduction in corrosion throughout the entire production and collecting system may be obtained.

The nature of the inhibiting action of my improved composition is not fully understood, but apparently the imidazolidine-pyrrolinedione compounds of this invention preferentially wet the surface of the metal equipment with oil, thus excluding the brine from contact with the metal. In any event, however, no matter what the mechanics of the corrosion inhibiting may be, they are extremely and surprisingly effective in protecting oil well and oil field equipment from corrosion, even when used in amounts of 50 p. p. m. or less, based on the oil content of the well fluid.

It is to be understood that the improved compositions of my invention are not limited to use alone, and may be applied along with other agents commonly introduced in the producing oil wells for breaking emulsions, preventing scale formations, minimizing pitting, etc. It is further evident that my invention is not restricted to the use of improved compositions for inhibitng corrosion in oil wells, but may be employed to perform this function in the presence of corrosive fluids derived from other sources.

Having now described my invention, what I claim as new and useful is:

1. The process of preventing the corrosion of ferrous metals when exposed to contact with corrosive fluids which contain varying amounts of hydrogen sulfide, carbon dioxide and other acidic materials which comprises incorporating into the corrosive fluids a small but sufficient quantity of a compound having the formula

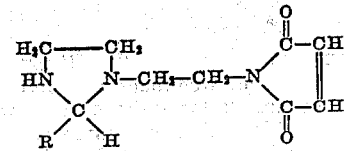

wherein R is the residue of an aldehyde having from 1 to 15 carbon atoms, and thereafter passing said compound in contact with the metal to be protected.

2. The process of preventing the corrosion of ferrous metals when exposed to contact with corrosive fluids which contain varying amounts of hydrogen sulfide, carbon dioxide and other acidic materials which comprises incorporating into the corrosive fluids a small but sufficient quantity of a compound having the formula

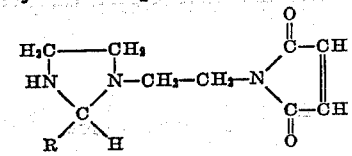

wherein R is a saturated hydrocarbon radical having from 1 to 15 carbon atoms, and passing said compound in contact with the metal to be protected.

3. The process of preventing the corrosion of ferrous metals when exposed to contact with corrosive fluids which contain varying amounts of hydrogen sulfide, carbon dioxide and other acidic materials which comprises incorporating into the corrosive fluids a small but sufficient quantity of a compound having the formula

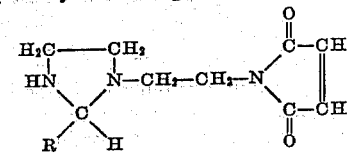

wherein R is a monovalent aliphatic hydrocarbon radical having from 1 to 15 carbon atoms, and passing said compound in contact with the metal to be protected.

4. The process of preventing the corrosion of ferrous metals as claimed in claim 3, wherein R is a propyl group.

5. The process of preventing the corrosion of ferrous metals as claimed in claim 3, wherein R is a butyl group.

6. The process of preventing the corrosion of ferrous metals as claimed in claim 3, wherein R is a hexyl group.

7. The process of preventing the corrosion of ferrous metals when exposed to contact with corrosive fluids which contain varying amounts of hydrogen sulfide, carbon dioxide and other acidic materials which comprises incorporating into the corrosive fluids a small but sufficient quantity of a compound having the formula

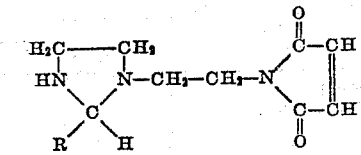

wherein R is a benzyl group, and passing said compound in contact with the metal to be protected.

References Cited in the file of this patent

UNITED STATES PATENTS

| | | |
|---|---|---|
| 2,643,227 | Hughes | June 23, 1953 |
| 2,643,978 | Hughes | June 30, 1953 |
| 2,724,695 | Hughes | Nov. 22, 1955 |
| 2,727,003 | Hughes | Dec. 13, 1955 |

OTHER REFERENCES

Hollins: The Synthesis of Nitrogen Ring Compounds, page 49 (1924), Van Nostrand Co. N. Y.